United States Patent
Mallick et al.

(10) Patent No.: US 12,394,019 B2
(45) Date of Patent: Aug. 19, 2025

(54) SYSTEM AND METHOD FOR SMART CONTOUR COMPLETION

(71) Applicant: L&T TECHNOLOGY SERVICES LIMITED, Chennai (IN)

(72) Inventors: Triptesh Mallick, Bankura (IN); Tarun Kumar Das, Digboi (IN); Mridul Balaraman, Bangalore (IN); Madhusudan Singh, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

(21) Appl. No.: 17/799,524

(22) PCT Filed: Aug. 1, 2022

(86) PCT No.: PCT/IB2022/057117
§ 371 (c)(1),
(2) Date: Aug. 12, 2022

(87) PCT Pub. No.: WO2023/031698
PCT Pub. Date: Mar. 9, 2023

(65) Prior Publication Data
US 2024/0185387 A1 Jun. 6, 2024

(30) Foreign Application Priority Data
Sep. 2, 2021 (IN) .............................. 202141039736

(51) Int. Cl.
| | |
|---|---|
| G06T 5/30 | (2006.01) |
| G06T 7/194 | (2017.01) |
| G06V 10/25 | (2022.01) |
| G06V 10/30 | (2022.01) |
| G06V 10/46 | (2022.01) |

(52) U.S. Cl.
CPC ............. *G06T 5/30* (2013.01); *G06T 7/194* (2017.01); *G06V 10/25* (2022.01); *G06V 10/30* (2022.01); *G06V 10/46* (2022.01)

(58) Field of Classification Search
CPC .......... G06T 5/30; G06T 7/194; G06V 10/25; G06V 10/30; G06V 10/46; G06V 10/56; G06V 30/422
See application file for complete search history.

(56) References Cited

FOREIGN PATENT DOCUMENTS

CN          112183038 A  *  1/2021

OTHER PUBLICATIONS

Alhéritière, H., Amaïeur, W., Cloppet, F., Kurtz, C., Ogier, J.M. and Vincent, N., 2019. Straight line reconstruction for fully materialized table extraction in degraded document images. In Discrete Geometry for Computer Imagery: 21st IAPR International Conference, DGCI 2019, Marne-la-vallée, France, Mar. 26-28.*

* cited by examiner

*Primary Examiner* — Zhitong Chen
(74) *Attorney, Agent, or Firm* — Kendal M. Sheets

(57) ABSTRACT

The present disclosure recites a system and a method to evaluate the scanned images of tables, identify at least one of the noises, errors and incomplete contours present therein (that make it difficult to extract cell location and it's contains) and process the said images of tables to remove the detected noises/errors from the images of the table and provide final images of table with complete contours. Therefore, said system disclosed herein is configured to take an image of table with incomplete contours (i.e. containing line gaps), as input and provides output in form of a processed image with all contours completed.

10 Claims, 8 Drawing Sheets

| Index_no | x | y | w | h | Width | height | Type |
|---|---|---|---|---|---|---|---|
| 0 | 9 | 9 | 3287 | 2323 | 3300 | 2550 | Table |
| 1 | 167 | 120 | 2967 | 2101 | 3300 | 2550 | Table |
| 2 | 1157 | 2183 | 934 | 33 | 3300 | 2550 | Table |
| 3 | 2912 | 2176 | 216 | 40 | 3300 | 2550 | Table |
| 4 | 1157 | 2160 | 934 | 21 | 3300 | 2550 | Table |
| 5 | 1095 | 2159 | 60 | 57 | 3300 | 2550 | Table |
| 6 | 1032 | 2159 | 61 | 57 | 3300 | 2550 | Table |
| 7 | 969 | 2159 | 61 | 57 | 3300 | 2550 | Table |
| 8 | 907 | 2159 | 60 | 57 | 3300 | 2550 | Table |
| 9 | 844 | 2159 | 61 | 57 | 3300 | 2550 | Table |
| 10 | 344 | 2159 | 498 | 57 | 3300 | 2550 | Table |
| 11 | 229 | 2159 | 113 | 57 | 3300 | 2550 | Table |
| 12 | 171 | 2159 | 56 | 57 | 3300 | 2550 | Table |
| 13 | 2912 | 2147 | 216 | 27 | 3300 | 2550 | Table |
| 14 | 2253 | 2147 | 657 | 69 | 3300 | 2550 | Table |
| 15 | 2093 | 2147 | 158 | 69 | 3300 | 2550 | Table |
| 16 | 1095 | 2125 | 60 | 32 | 3300 | 2550 | Table |
| 17 | 1032 | 2125 | 60 | 32 | 3300 | 2550 | Table |
| 18 | 969 | 2125 | 61 | 32 | 3300 | 2550 | Table |
| 19 | 907 | 2125 | 60 | 32 | 3300 | 2550 | Table |

Fig- 2A

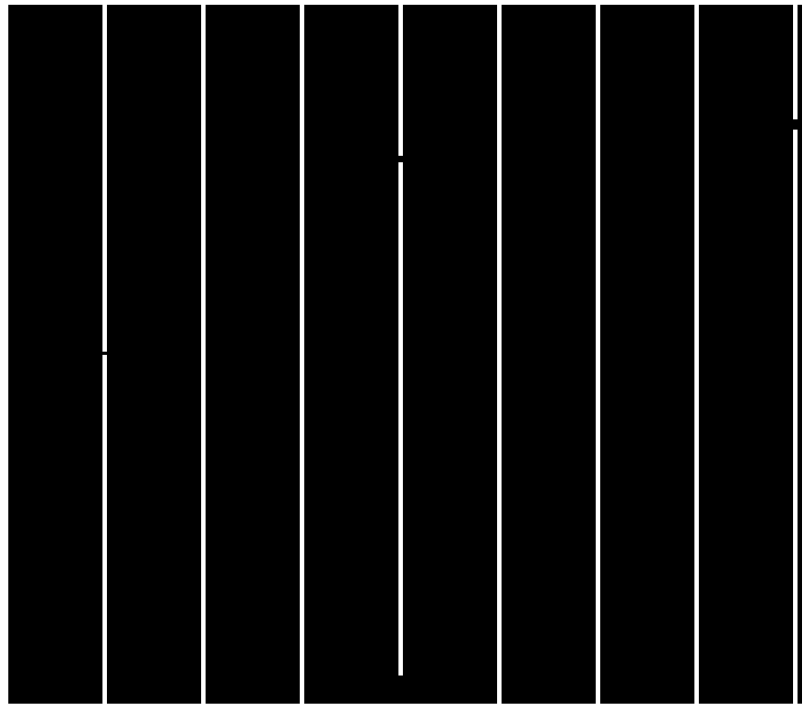
Fig- 2B'
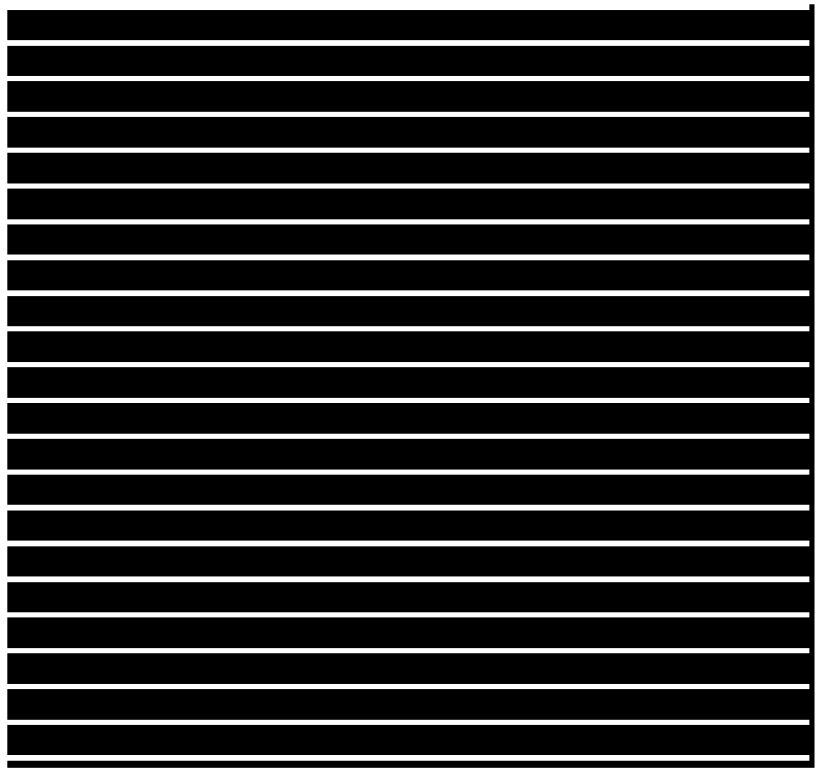
Fig- 2B"

| Index_no | x | y | w | h | Width | height | Type |
|---|---|---|---|---|---|---|---|
| 0 | 9 | 9 | 3287 | 2323 | 3300 | 2550 | Table |
| 1 | 167 | 120 | 2967 | 2101 | 3300 | 2550 | Table |
| 2 | 1157 | 2183 | 934 | 33 | 3300 | 2550 | Table |
| 3 | 2912 | 2176 | 216 | 40 | 3300 | 2550 | Table |
| 4 | 1157 | 2160 | 934 | 21 | 3300 | 2550 | Table |
| 5 | 1095 | 2159 | 60 | 57 | 3300 | 2550 | Table |
| 6 | 1032 | 2159 | 61 | 57 | 3300 | 2550 | Table |
| 7 | 969 | 2159 | 61 | 57 | 3300 | 2550 | Table |
| 8 | 907 | 2159 | 60 | 57 | 3300 | 2550 | Table |
| 9 | 844 | 2159 | 61 | 57 | 3300 | 2550 | Table |
| 10 | 344 | 2159 | 498 | 57 | 3300 | 2550 | Table |
| 11 | 229 | 2159 | 113 | 57 | 3300 | 2550 | Table |
| 12 | 171 | 2159 | 56 | 57 | 3300 | 2550 | Table |
| 13 | 2912 | 2147 | 216 | 27 | 3300 | 2550 | Table |
| 14 | 2253 | 2147 | 657 | 69 | 3300 | 2550 | Table |
| 15 | 2093 | 2147 | 158 | 69 | 3300 | 2550 | Table |
| 16 | 1095 | 2125 | 60 | 32 | 3300 | 2550 | Table |
| 17 | 1032 | 2125 | 60 | 32 | 3300 | 2550 | Table |
| 18 | 969 | 2125 | 61 | 32 | 3300 | 2550 | Table |
| 19 | 907 | 2125 | 60 | 32 | 3300 | 2550 | Table |

SYSTEM AND METHOD FOR SMART CONTOUR COMPLETION

CROSS-REFERENCE TO RELATED APPLICATIONS

The present application is a filing under 35 U.S.C. 371 as the National Stage of International Application No. PCT/IB2022/057117, filed Aug. 1, 2022, entitled "SYSTEM AND METHOD FOR SMART CONTOUR COMPLETION," which claims priority to Indian Application No. 202141039736 filed with the Intellectual Property Office of India on Sep. 2, 2021 and entitled "SYSTEM AND METHOD FOR CONTOUR COMPLETION," both of which are incorporated herein by reference in their entirety for all purposes.

TECHNICAL FIELD

The present subject matter described herein, in general, discloses method and system for smart contour completion for images containing tables with incomplete contours (i.e. incomplete lines/line gaps).

BACKGROUND

It is often seen that the scanned engineering drawings mostly contain useful information in the form of table, text and graphical data. Furthermore, it has been observed that most of these scanned drawings that contain tables have various errors in the tabulated data that make the content of table unclear for a user. Precisely, these scanned tables contain various unwanted dots or lines inside a cell of the table that are undesirable and occur due to various technical errors during the processing of the image. Furthermore, another major concern with these tables is incomplete contours i.e. occurrence of incomplete lines or gaps between lines that make the boundary of various cells within the table unclear and thus leading to an unclear table image. In particular, given the scanned images of tables, that contain such noises/errors and incomplete contour it is very difficult to extract cell location and it's contents.

Thus, there exist a need in the art for a technique which provides simple yet effective mechanism for identifying and removing these noises and completing the incomplete contours within a table image making the content of the table more clearer and useful for the user.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one non-limiting embodiment of the present disclosure a computer implemented method for smart contour completion is disclosed. Said method discloses converting an input image into grayscale image for segregating foreground region from background region by an adaptive threshold mechanism. The method further discloses the steps of extracting all horizontal lines and all vertical line from said converted image, separately and combining the extracted horizontal lines with the extracted vertical lines to define a table image with N cells. Said method as next step discloses removing noisy edge segments from said table image and scanning boundary of each cell in the table image for identifying the cells with broken contours, wherein the cells with broken contour are identified as Region of Interest (ROI). Further, the method discloses obtaining joins from said table image and defining a kernel size from said joins and defining exterior boundary for said table image. Finally the method discloses dilating the broken contours, within defined boundary, in each ROI with the defined kernel size, in response to determining that the broken contour in the ROI is an endpoint and is not near the join, for contour completion.

In another non-limiting embodiment of the present disclosure, the method further discloses identifying lines present at least inside the cell and outside the defined boundary of the table image and eliminating said lines from the table image, wherein removing the lines identified outside the defined boundary of the table image is optional.

In yet another non-limiting embodiment of the present disclosure, the kernel size is defined by selecting a join with maximum height and maximum width from all the joins obtained.

In still another non-limiting embodiment of the present disclosure, the background region is represented by black color and the foreground region is represented by plurality of vertical and horizontal lines, separately, in white color.

In yet another non-limiting embodiment of the present disclosure, the method further discloses defining a suitable kernel size among different kernel sizes for perfect dilation for contour completion.

In another non-limiting embodiment of the present disclosure a system to provide smart contour completion is disclosed. Said system comprises an image conversion unit configured to convert an input image into grayscale image to segregate foreground region from background region by an adaptive threshold mechanism and an image extractor operatively coupled to the image conversion unit that is configured to extract all horizontal lines and all vertical line from said converted image, separately. Said system further discloses an adder configured to combine the extracted horizontal lines with the extracted vertical lines to define a table image with N cells. In another embodiment, said system further discloses a processing unit operatively coupled to the adder. Said processing unit is further configured to remove noisy edge segments from said table image, scan boundary of each cell in the table image to identify the cells with broken contours, wherein the cells with broken contour is defined as Region of Interest (ROI) and obtain joins from said table image and define a kernel size from said joins. Further, said processing unit is configured to define exterior boundary for said table image and dilate the broken contours, within defined boundary, for each ROI with the defined kernel size, in response to determining that the broken contour in the ROI is an endpoint and is not near the join, for contour completion.

In still another non-limiting embodiment the present disclosure describes that to remove the noisy edge segments from said table image, said processor is configured to: identify lines present at least inside the cell and outside the defined boundary of the table image and eliminate said lines from the table image, wherein removing the lines identified outside the defined boundary of the table image is optional.

In yet another non-limiting embodiment of the present disclosure, the processor is further configured to define the kernel size by selecting a join with maximum height and maximum width from all the joins obtained In still another non-limiting embodiment of the present disclosure, the image extractor is configured to segregate the background region by black color and the foreground region by plurality of vertical and horizontal lines, separately, in white color.

In yet another non-limiting embodiment the present disclosure recites that the processor is further configured to define a suitable kernel size among different kernel sizes for perfect dilation for contour completion.

Objectives of the Invention

An objective of the present invention is to provide a system and a method for removing errors/noises from a scanned table image without affecting the content of the table image.

Another objective of the present invention is to provide a system and a method to complete the incomplete contours within the table image making the cells of the table image clearer and the content therein useful.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2A-2I illustrates an exemplary embodiment explaining the functionality of the system disclosed in FIG. 1, in accordance with an embodiment of the present subject matter.

Figure 1:
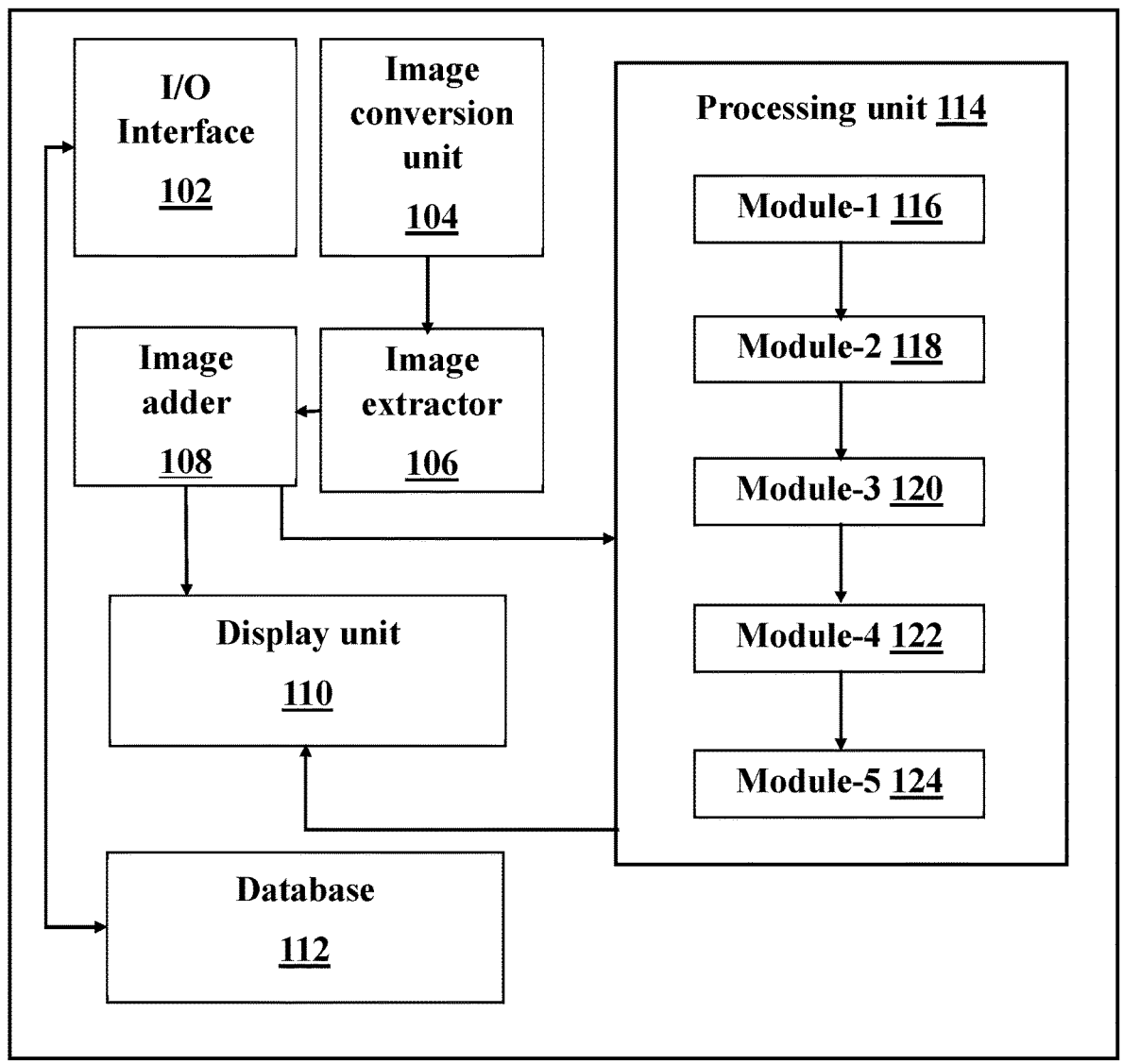
FIG. 1 illustrates by way of a block diagram a system to provide smart contour completion, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject-matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", "include(s)", or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present invention will be described herein below with reference to the accompanying drawings. In the following description, well known functions or constructions are not described in detail since they would obscure the description with unnecessary detail.

The present disclosure recites a system to evaluate the scanned images of tables, identify at least one of the noises, errors and incomplete contours present therein (that make it difficult to extract cell location and it's contains) and process the said images of tables to remove the detected noises/errors from the images of the table and provide final images of table with complete contours. In an embodiment, the system disclosed herein is configured to take an image of table with incomplete contours (i.e. containing line gaps), as input and provides output in form of a processed image with all contours completed.

Referring to FIG. 1, a system 100 that evaluates the scanned images of tables and completes incomplete contours within the images of table is disclosed. The system 100 may comprise an I/O interface 102. Said I/O interface 102 may be configured to receive a scanned image that contains one or more tables. In an exemplary embodiment, the I/O interface unit 102 may be configured to receive the images containing one or more table from an exterior source (not shown) that could be another computer, mobile, printer or any such other electronic source or from an internal source such as database 112 that may have plurality of images stored therein.

In a non-limiting embodiment of the present disclosure the image received by the I/O interface 102 for processing may be a 2D or a 3D engineering drawing having content reflected in the form of tables. Further, the received image is not limited to said format and it may include an image in file format such as PDF, JPG, PNG or any other file format that is readable by the system 100.

As shown in FIG. 1, system 100 may further include an image conversion unit 104 operatively connected to the I/O interface 102. The main purpose of the image conversion unit 104 is to convert the received image into a greyscale image for further processing. Precisely, the main objective of the image conversion unit 104, for converting the received image into greyscale image, is to segregate foreground region of the received image of the table from the background region of the received image of the table. To do so, the image conversion unit 104 is configured to convert the background region of the image into black scale and the foreground region of the said image into white scale. Furthermore, since the image converted into greyscale is the image of a table the foreground region is reflected as plurality of white horizontal and vertical lines.

In a non-limiting embodiment, the image conversion unit 104 may use an adaptive threshold mechanism for converting the received into greyscale image. Further, it is to be noted that the above discussed technique is one exemplary technique used for image conversion, whereas one of the several other known techniques may be used for such image conversion and the present disclosure is not limited to any one technique for image conversion.

The system 100 further comprise an image extraction unit 106 operatively coupled to the image conversion unit 104. The image extraction unit 106 is configured to extract the foreground region of the image from the background region of the image converted by the image conversion unit 104. In a non-limiting embodiment, the image extraction unit 106 is configured to segregate the foreground image into two different images. Precisely, the image extraction unit 106 may be configured segregate all the horizontal lines identified in the foreground region as one separate image and all the vertical lines identified in the foreground region as another separate image.

The image extraction unit 106 may then be configured to provide these two separate images to an adder 108 of the system 100. The adder 108 is configured to add these two images to form a single image. In particular, the adder 108 is configured to add all the horizontal lines received as one image and vertical lines received as the second image into one image forming an image of a table with N cells, as contained in the original received image, but in greyscale.

According to an exemplary embodiment, the adder 108 may remain connected to a display unit 110 of the system 100 to allow the user to view the image of the table prepared by the adder 108.

Further, as shown in FIG. 1, the system 100 may further include a processing unit 114. The processing unit 114 is configured to receive the greyscale image of the table prepared by the adder 108 for further processing. In a non-limiting embodiment, the processing unit 114 may include plurality of modules for processing the received table image.

For instance, the image received by the processing unit 114 is first passed to a module-1 116 also known as noise reduction module. The noise reduction module 116 is configured to remove the noisy edge segments from the received image. In particular, it may be noted that in the given input image of table, it is possible that there are a few unwanted lines inside each cell or outside the cells. The objective of the noise reduction module 116 is to identify such noisy edges and removes these noisy edges from the image of the table. Those skilled in the art will appreciate that it is very important to identify such noises and remove them from the image, so that a clear image of the table can be retrieved.

The processing unit 114 may further include a second module 118 also known as image scanning module. Said image scanning module 118 may be configured to scan the boundary of each and every cell in the image of the table to identify the cells with broken contours. In an exemplary embodiment, the region of the cells detected with broken contours are marked and defined as Region of Interest (ROI) for further processing. In a non-limiting embodiment, to scan each and every cell of the image of the table one of the known machine learning techniques may be employed.

Once, the cells with broken/incomplete contours are identified and marked as ROI, a join detection & kernel selection module 120 referred in FIG. 1 as Module-3 may be employed. In particular, the join detection & kernel selection module 120 may be configured to obtain joins (i.e. intersection points) of the lines from the table image processed by module-2 118 and define a kernel size from said joins. In a non-limiting embodiment, the join detection & kernel selection module 120 is configured to process the entire image both vertically and horizontal to obtain joins and once all the joins have been obtained, the join detection & kernel selection module 120 is configured to define a kernel size from said joins.

It is to be appreciated that it is important to find joins (i.e. intersection points) of the lines for mainly two reasons. (i). to make sure that dilation does not occur near joins, as it has been observed that in the dataset that the joins have small stubs near them that may extend, and these extensions are not needed for contour completion in the given image of table. (ii). finding out the joins in the given table image help to find the suitable kernel size that will define the dilation region. Further, it is to be noted that to define the best suited kernel size for dilation purpose, for contour completion, the join detection & kernel selection module 120 is configured to select a join with maximum height and maximum width from all the joins obtained. The main objective behind selecting a join with maximum height and maximum width, for kernel selection, is to make sure that lines of all thickness are taken into consideration.

The system 100 further discloses having a boundary defining module 122 (also known as module-4) contained with the processing module 114 and operatively connected the join detection & kernel selection module 120 of the processing unit 114. The boundary defining module 122 may be configured to define an exterior boundary for the processed image of the table. Precisely, the boundary defining module 122 may be configured to define the exterior limits for the table image to make sure lines don't extend outside said region.

Thereafter, module-5 also known as dilation module 124 is configured to dilate the broken contours, within the boundaries defined by the boundary defining module 122, for each ROI with the defined kernel size. Precisely, by carrying out said dilation process, the dilation module 124 is configured to provide a final clear image of the table with all lines within the table connected i.e. a table having a defined boundary for each cell within the image of the table. It is to be appreciated that the dilation module 124 only dilates the broken contours in response to determining that the broken contour in the ROI is an endpoint and is not near the join. Thus, it would not be incorrect to say that the dilation module 124 is configured to perform adaptive dilation, wherein the broken lines are extended only where endpoints are found, and those endpoints are not near the joins.

In another exemplary embodiment of the present disclosure, if any of said two conditions is not found satisfactory, the dilation module 124 is configured to reiterate the above process until the above two conditions are found satisfied. Furthermore, it is to appreciate that the processing unit 114 of FIG. 1 also remain connected to the display unit 110. The processing unit 114 may remain connected to the display unit 110 so as to display the final output image to the display unit 110 for user reference.

In an exemplary embodiment the term image of table, table image, table and image containing table used in the present disclosure have same meaning and thus said terms may be used interchangeably, without departing from the scope. Furthermore, the modules 116-124 contained within the processing unit 114 may be firmware, software or a combination therefore and work in conjunction with each other achieve the desired objective of the invention. Furthermore, the processing unit 114 described in FIG. 1 may include a microcontroller, a microprocessor or an Application Specific Integrated Circuit (ASIC) specifically designed to carry out the functionalities of the instant application.

The functionality of the system 100 of FIG. 1 may be understood by way of an example. In this regard, reference may be made to FIG. 2A-2H, discussed below.

For example, FIG. 2A represents an image of a table that contains various errors/noises (some of which have been highlighted in red for reference) and incomplete contours (some of which have been highlighted in yellow for reference) that make it difficult for a user to extract cell location and it's contains from the table image. The I/O interface 102 of system 100 discussed in above paragraphs allows the user to feed said image to the image conversion unit 104, as an input image.

Moving ahead FIG. 2B, shows an output of the image conversion unit 104. In particular, as discussed in above paragraphs, when the image as shown in FIG. 2A is received by the image conversion unit 104, the image conversion unit converts it into greyscale image as shown in FIG. 2B and separates foreground region (indicated by white lines) from the background region (indicated by black space).

In addition, FIG. 2B further shows, as an output, how said grayscale image is converted into two separate images, by the image extraction unit 106, for the detected foreground region. In particular, FIG. 2B' represents a foreground region of the table image containing all the vertical lines stacked together and 2B" represents a foreground region of the table image containing all the horizontal lines stacked together.

Figure 2C:
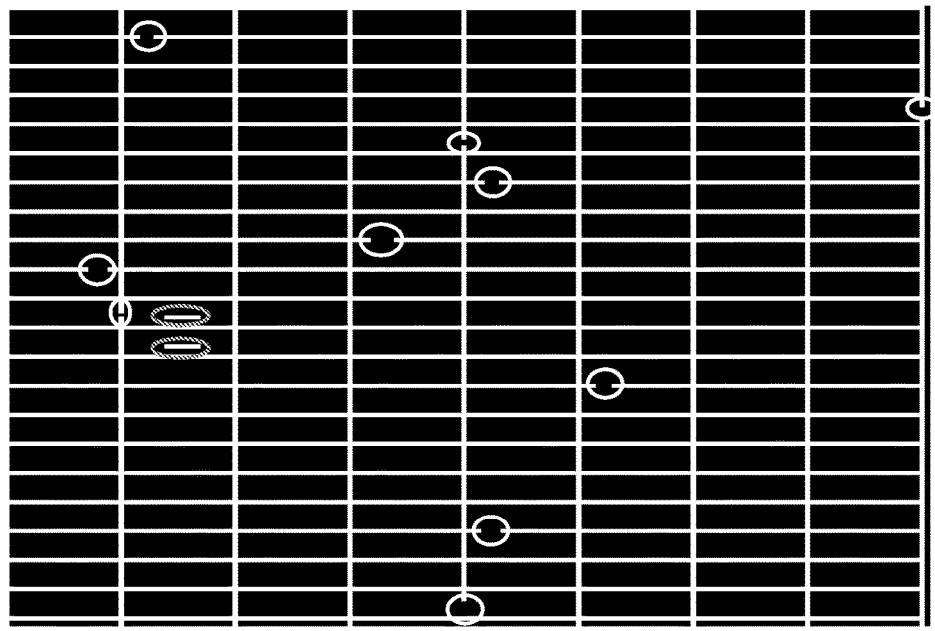

Further, FIG. 2C represents an output image as processed by the adder 106. In particular, the output of the adder 108 is represented by adding all the extracted vertical line with all the extracted horizontal lines together to form a table in greyscale having N cells.

Figure 2D:
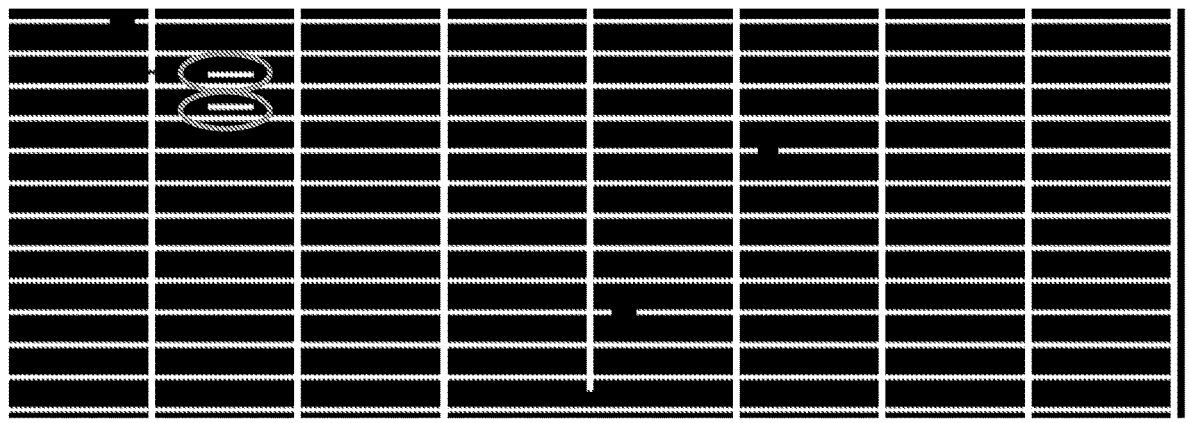

Moving ahead with said example, in FIG. 2D can be seen how the noise reduction module 116 is configured to remove the noisy edge segments from the received image. In particular, it may be seen that in the given input image of table, it is possible that there are a few unwanted lines inside each cell (as highlighted in red) or outside the cells. The noise reduction module 116 is configured to identify these noisy edge segments from the received image and removes them using one or more known techniques.

In addition, though not explicitly shown in FIG. 2, the scanning module 118 may be configured to scan the boundary of each and every cell in the image of the table to identify the cells with broken contours. In an exemplary embodiment, the region of the cells detected with broken contours are marked and defined as Region of Interest (ROI) for further processing.

Figure 2E:
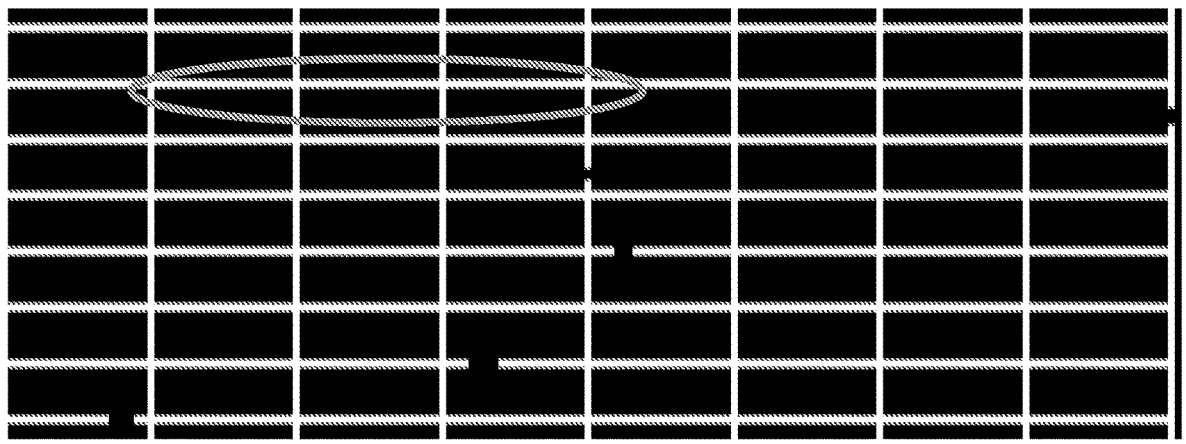
Figure 2F:
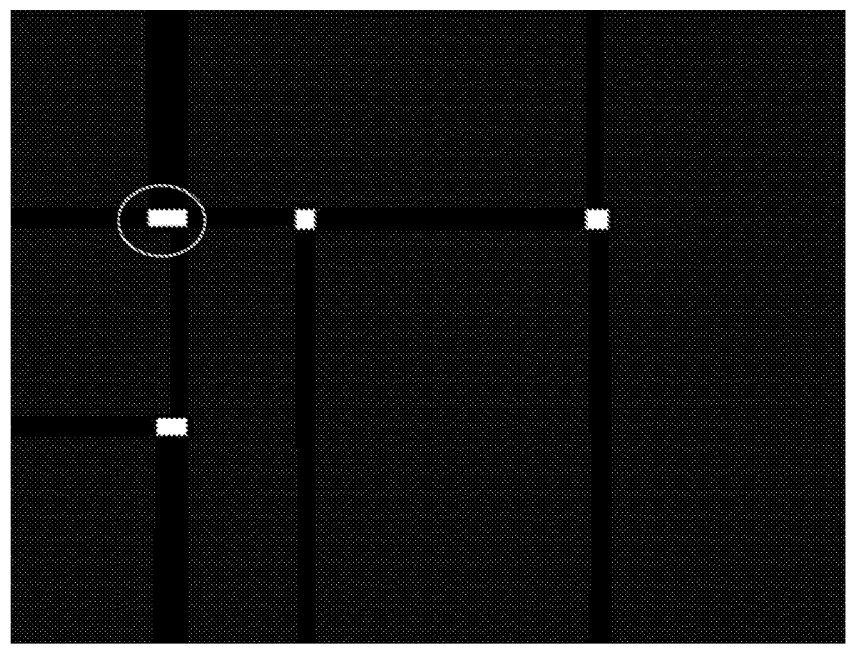

Further, as can be seen in FIG. 2E, the processing unit, by means of join detection & kernel selection module 120, is configured to obtain joins (i.e. intersection points) of the lines (as highlighted in red) from the table image processed by module-2 118 and define a kernel size from said joins, as shown in FIG. 2F.

Figure 2G:
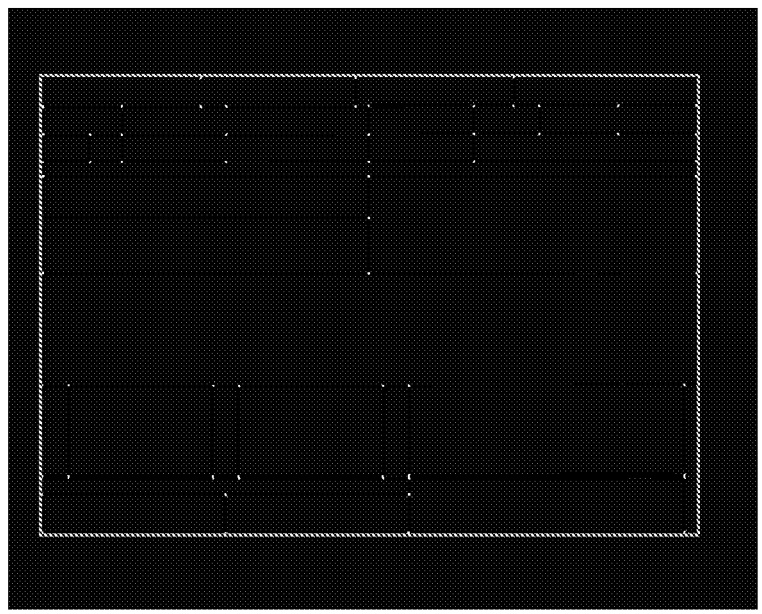

Moving ahead, FIG. 2G shows an output of the boundary defining module 122. In particular, the boundary defining module is configured to define an external boundary of the table image (as highlighted in red). In particular, said boundary is defined to ensure that no line of the table crosses said boundary.

Figure 2H:
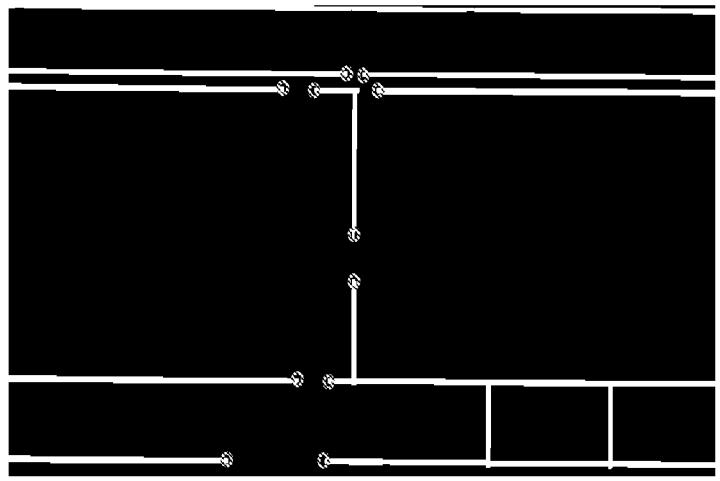

Further shown in FIG. 2H is the process of dilation carried out by the dilation module 124. In particular, as can be seen in FIG. 2H, the dilation module 124 is configured to dilate the broken contours (as highlighted in red), within the boundaries defined by the boundary defining module 122, for each ROI with the defined kernel size for contour completion.

Figure 2I:
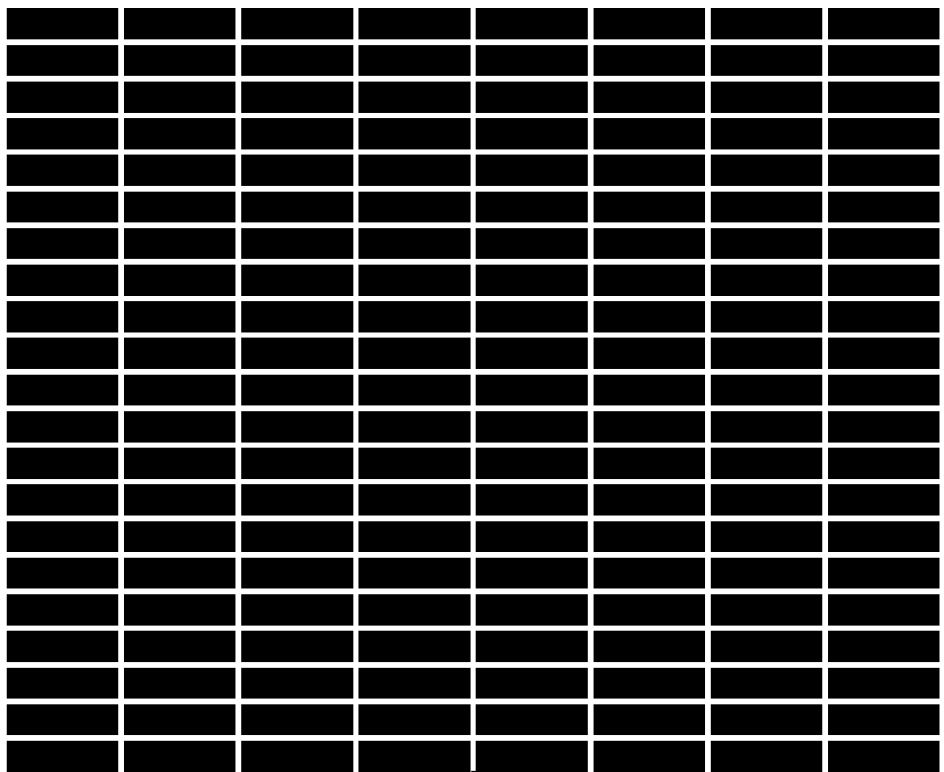

Finally, FIG. 2I can be seen reflecting a final output image of a table with no noises/error and no incomplete contours, with the help of process carried out by system 100 of FIG. 1, as discussed in detail in above paragraphs.

Figure 3:
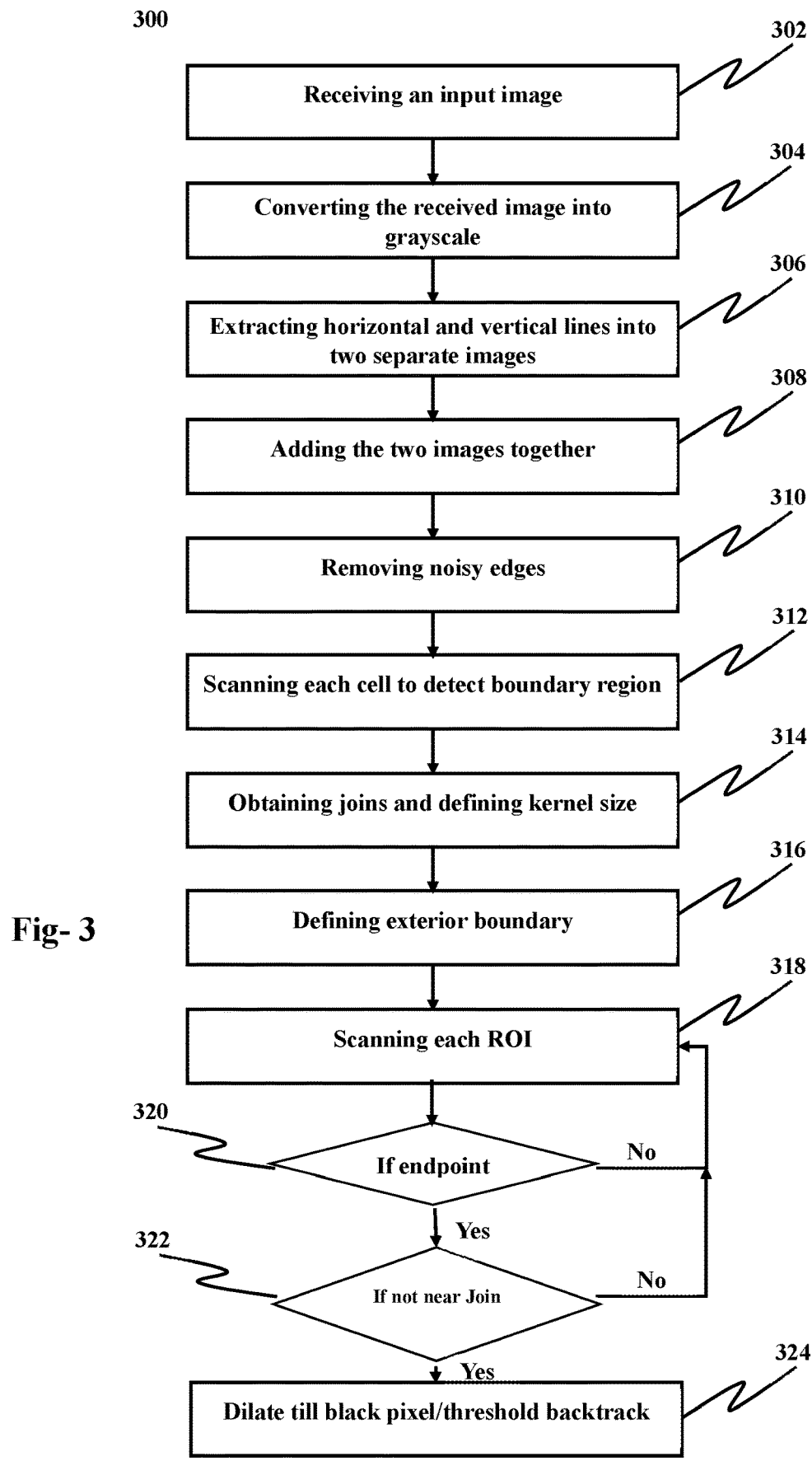
FIG. 3 reflects by way of a flow diagram a method for smart contour completion, in accordance with an embodiment of the present subject matter.

FIG. 3 discloses a method 300 for receiving an image of table with incomplete contours (i.e. containing line gaps), and outputting a processed image that has all contours completed.

The method starts at step 302, by receiving an input image, from either an external source or an internal source, for processing. In an exemplary embodiment, the input image contains one or more tables with various unwanted errors/noises and incomplete contours.

The method 300 at the next step 304, discloses converting the received image of tables into greyscale image. In particular, the method 300 at said step 304 discloses converting the input image into a grayscale image by using an adaptive threshold mechanism. Precisely, the conversion of image from input image to grayscale image is done to segregate foreground region of the image from the background region of the image. In an example, the foreground region is depicted by plurality of horizontal and vertical lines in white colour to separate it from the background region of the image depicted in black colour.

The method 300 then moves to step 306 that discloses extracting all horizontal lines and all vertical line from said converted image, separately. In particular the step of extracting processes the converted greyscale image into two different images, wherein one image depicts all the vertical lines stacked together and the second image discloses all the horizontal lines stacked together.

At step 308, the method 300 discloses adding the two images obtained in above step (506), to form a single image of the table. In particular, said step 308 discloses combining the extracted horizontal lines with the extracted vertical lines to define a table image with N cells.

Moving ahead, the method 300 at step 310 discloses removing noisy edge segments from said table image. Those skilled in the art will appreciate that the converted image of the table may contain some unwanted lines inside the cell and some outside the cell/table and it is necessary to remove these noises/error from the table as they may hamper the output. Thus, the method 300 at step 310 discloses removing noisy edge segments from said table image by using a deep machine learning algorithm. However, removing the lines present outside the table is optional as it may not hamper the output image as the noise/error is outside the table.

The method 300 further at step 312 discloses scanning boundary of each and every cell in the table image for identifying the cells with broken contours, wherein the cells with broken contour are identified as Region of Interest (ROI). In order to scan the boundary of cells within the table the processing unit 114 may use deep machine learning algorithm designed for said purpose.

Once all the cells are scanned, the method 300 moves to step 314 that includes obtaining joins from said table image and defining a kernel size from said joins. Once again for obtaining the joins from said table image, adaptive machine learning algorithm may be used that scans all the joins within the table both vertically and horizontally. It is to be noted that for contour completion it is important to find joins (i.e. intersection points) of the lines for mainly two reasons. The first is to make sure that dilation does not occur near joins. This is because, it has been observed in the dataset that the joins have small stubs near them that may extend, and these extensions are not needed for our purpose. The second reason is to find the suitable kernel size that will define the dilation region.

Furthermore, the step 314 also includes the step of defining a kernel size from said joins. This is done by the help of joins found in the previous step. In particular, the kernel size is defined by taking the maximum width and maximum height from all the joins. Those skilled in the art will appreciate that the reason for choosing the join with maximum height and width as suitable kernel is because it makes sure that lines of all thickness are taken into consideration.

At next step 316, the method 300 moves to the next step of defining exterior boundary for said table image. It is to be noted that for the process of contour completion it is necessary to define the exterior limits for the table image to make sure lines don't extend outside that region. The method 300 finally at step 318 looks out for every ROI whether it is an endpoint or not. If the method at step 320 detects it as endpoint, the method moves at step 322 to check for other condition. In particular, in the next step 322, the method 500 check whether if the endpoint is not near the join, and if it is found that it is not near the join the method 300 at step 324 to perform the step of dilation to combine these endpoints to complete contour. However, if at step 320 the method 300 finds that for said ROI the detected portion is not an endpoint, the method moves and checks the same for next ROI. Similarly, if the method 300 at step 322 finds out the endpoint is not near the join, the method 300 discloses moving to the next ROI. It is to be noted that the said process is repeated for each ROI.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Suitable processors/controllers include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

We claim:

1. A computer implemented method for smart contour completion, said method comprising:
    converting an input image into grayscale image for segregating foreground region from background region by an adaptive threshold mechanism;
    extracting all horizontal lines and all vertical line from said converted image, separately;
    combining the extracted horizontal lines with the extracted vertical lines to define a table image with N cells;
    removing noisy edge segments from said table image;
    scanning boundary of each cell in the table image for identifying the cells with broken contours, wherein the cells with broken contour are identified as Region of Interest (ROI);
    obtaining joins from said table image and defining a kernel size from said joins;
    defining exterior boundary for said table image; and
    dilating the broken contours, within defined boundary, in each ROI with the defined kernel size, in response to determining that the broken contour in the ROI is an endpoint and is not near the join, for contour completion.

2. The method of claim 1, wherein removing noisy edge segments from said table image comprises:
    identifying lines present at least inside the cell and outside the defined boundary of the table image; and
    eliminating said lines from the table image, wherein removing the lines identified outside the defined boundary of the table image is optional.

3. The method of claim 1, wherein the kernel size is defined by selecting a join with maximum height and maximum width from all the joins obtained.

4. The method of claim 1, wherein the background region is represented by black colour and the foreground region is represented by plurality of vertical and horizontal lines, separately, in white colour.

5. The method of claim 1, further comprises defining a suitable kernel size among different kernel sizes for perfect dilation for contour completion.

6. A system to provide smart contour completion, said system comprising:
    an image conversion unit configured to convert an input image into grayscale image to segregate foreground region from background region by an adaptive threshold mechanism;
    an image extractor operatively coupled to the image conversion unit and configured to extract all horizontal lines and all vertical line from said converted image, separately;
    an adder configured to combine the extracted horizontal lines with the extracted vertical lines to define a table image with N cells; and a processing unit operatively coupled to the adder, wherein the processing unit is configured to:

remove noisy edge segments from said table image;

scan boundary of each cell in the table image to identify the cells with broken contours, wherein the cells with broken contour is defined as Region of Interest (ROI);

obtain joins from said table image and define a kernel size from said joins;

define exterior boundary for said table image; and dilate the broken contours, within defined boundary, for each ROI with the defined kernel size, in response to determining that the broken contour in the ROI is an endpoint and is not near the join, for contour completion.

7. The system of claim 6, wherein to remove the noisy edge segments from said table image said processor is configured to:

identify lines present at least inside the cell and outside the defined boundary of the table image; and eliminate said lines from the table image, wherein removing the lines identified outside the defined boundary of the table image is optional.

8. The system of claim 6, wherein the processor is further configured to define the kernel size by selecting a join with maximum height and maximum width from all the joins obtained.

9. The system of claim 6, wherein the image extractor is configured to segregate the background region by black colour and the foreground region by plurality of vertical and horizontal lines, separately, in white colour.

10. The system of claim 6, wherein the processor is further configured to define a suitable kernel size among different kernel sizes for perfect dilation for contour completion.

* * * * *